United States Patent
Sadr

(10) Patent No.: US 10,127,412 B2
(45) Date of Patent: Nov. 13, 2018

(54) LOCATION ESTIMATION AND TRACKING FOR PASSIVE RFID AND WIRELESS SENSOR NETWORKS USING MIMO SYSTEMS

(71) Applicant: Mojix, Inc., Los Angeles, CA (US)

(72) Inventor: Ramin Sadr, Los Angeles, CA (US)

(73) Assignee: Mojix, Inc., Los Angeles, CA (US)

( * ) Notice: Subject to any disclaimer, the term of this patent is extended or adjusted under 35 U.S.C. 154(b) by 0 days.

(21) Appl. No.: 15/479,233

(22) Filed: Apr. 4, 2017

(65) Prior Publication Data

US 2017/0286730 A1    Oct. 5, 2017

Related U.S. Application Data

(60) Provisional application No. 62/317,631, filed on Apr. 4, 2016, provisional application No. 62/481,016, filed on Apr. 3, 2017.

(51) Int. Cl.
| | |
|---|---|
| *G06K 7/10* | (2006.01) |
| *G01S 5/14* | (2006.01) |
| *G01S 1/02* | (2010.01) |
| *G01S 5/30* | (2006.01) |

(52) U.S. Cl.
CPC ............ *G06K 7/10099* (2013.01); *G01S 1/02* (2013.01); *G01S 5/145* (2013.01); *G01S 5/30* (2013.01); *G06K 7/10128* (2013.01); *H04Q 2209/75* (2013.01)

(58) Field of Classification Search
CPC .. G06K 7/10099; G06K 7/10128; G01S 5/30; G01S 5/145; G01S 1/02; H04Q 2209/75
See application file for complete search history.

(56) References Cited

U.S. PATENT DOCUMENTS

| | | | |
|---|---|---|---|
| 7,633,377 B2 | 12/2009 | Sadr | |
| 8,072,311 B2 | 11/2011 | Sadr et al. | |
| 8,395,482 B2* | 3/2013 | Sadr ................... | G06K 7/10188 340/10.3 |
| 8,400,271 B2 | 3/2013 | Sadr | |

(Continued)

OTHER PUBLICATIONS

Arthaber, Holger et al., "Spread-Spectrum Based Ranging of Passive UHF EPC RFID Tags", IEEE Communications Letters, vol. 19, No. 10, Oct. 2015, 1734-1737.

(Continued)

*Primary Examiner* — Brian Miller
(74) *Attorney, Agent, or Firm* — KPPB LLP

(57) ABSTRACT

Systems and methods for location estimation and tracking for passive RFID and wireless sensor networks in accordance with embodiments of the invention are disclosed. In one embodiment, a process for obtaining location information using an RFID reader system includes transmitting a combined interrogation and ranging signal from a plurality of antennas, where the ranging signal is a pseudorandom signal, receiving a backscattered return signal from an RFID tag at one or more receive antennas, extracting an information signal from the return signal and decoding the information signal to obtain RFID tag data, extracting a received ranging signal from the return signal, and estimating a range to the RFID tag based upon correlation between the ranging signal and the received ranging signal.

10 Claims, 19 Drawing Sheets

(56) References Cited

U.S. PATENT DOCUMENTS

| | | | | |
|---|---|---|---|---|
| 8,421,676 | B2* | 4/2013 | Moshfeghi | G01S 5/14 342/442 |
| 8,768,248 | B2* | 7/2014 | Sadr | G06K 7/0008 340/10.1 |
| 2007/0096876 | A1* | 5/2007 | Bridgelall | H04B 7/0802 340/10.1 |
| 2008/0111661 | A1* | 5/2008 | Lin | G06K 7/0008 340/10.1 |
| 2012/0176227 | A1* | 7/2012 | Nikitin | G06K 7/10356 340/10.2 |
| 2012/0176272 | A1* | 7/2012 | Hirata | G01S 5/145 342/383 |
| 2013/0278393 | A1* | 10/2013 | Zumsteg | G06K 7/10079 340/10.6 |
| 2014/0253296 | A1* | 9/2014 | Arthaber | G01S 13/751 340/10.5 |
| 2014/0266619 | A1* | 9/2014 | Ali | G01S 13/00 340/10.1 |
| 2014/0347165 | A1* | 11/2014 | Bremer | G06K 7/10217 340/10.1 |
| 2014/0347168 | A1* | 11/2014 | Sanders | G01S 13/74 340/10.4 |
| 2015/0063070 | A1* | 3/2015 | Ojanpera | G01S 11/14 367/127 |
| 2016/0104013 | A1* | 4/2016 | Fessler | G01R 25/00 340/10.1 |
| 2016/0148025 | A1* | 5/2016 | Ohashi | G06K 7/10128 340/10.1 |

OTHER PUBLICATIONS

Blake, "Perfect Sequences and Arrays over the Unit Quaternions", Information Theory, Dec. 8, 2016, retrieved from arXiv:1701.01154v1 [cs.IT] Dec. 8, 2016, 13 pages.

Brualdi et al., "Patterns of Alternating Sign Matrices", Combinatorics, Apr. 22, 2011, retrieved from arXiv:1104.4075v2 [math.CO] Apr. 21, 2011, 35 pages.

Buck, Markus et al., "Acoustic Array Processing for Speech Enhancement", Handbook on Array Processing and Sensor Networks, Chapter 8, 2009, 231-266.

Calderbank, A. R. et al., "Instantaneous Radar Polarimetry with Multiple Dually-polarized Antennas", Program in Applied and Computational Mathematics, Princeton University, Princeton, NJ, USA, 2006, 757-761.

Cheston et al., "Array Antennas", The Johns Hopkins University, Applied Physics Laboratory, TG-956, Mar. 1968, 149 pages.

Chizhik et al., "Keyholes, Correlations, and Capacities of Multielement Transmit and Receive Antennas", IEEE Transactions on Wireless Communications, vol. 1, No. 2, Apr. 2002, pp. 361-368.

Elkies et al., "Alternating-Sign Matrices and Domino Tilings (Part II)", Journal of Algebraic Combinatorics, vol. 1, 1992, pp. 219-234.

Fishler, Eran et al., "MIMO radar: an idea whose time has come", New Jersey Institute of Technology, Newark, NJ, USA, 2004, 71-78.

Fuchs et al., "Optimal Polarization Synthesis of Arbitrary Arrays subject to Power Pattern Constraints", IEEE, 2011, pp. 118-121.

Fuchs et al., "Optimal Polarization Synthesis of Arbitrary Arrays With Focused Power Pattern", IEEE Transactions on Antennas and Propagation, vol. 59, No. 12, Dec. 2011, pp. 4512-4519.

Gong et al., "Quaternion ESPRIT for Direction Finding with a Polarization Sentive Array", 2008 9th International Conference on Signal Processing, Oct. 26-29, 2008, 4 pages.

Hansen, R. C., "Array Pattern Control and Synthesis", Proceedings of the IEEE, vol. 80, No. 1, Jan. 1992, pp. 141-151.

He et al., "On the performance of MIMO RFID backscattering channels", EURASIP Journal on Wireless Communications and Networking, vol. 357, 2012, 15 page, http://jwcn.eurasipjournals.com/content/2012/1/357.

Josefsson et al., "Conformal Array Antenna Theory and Design", IEEE Antennas and Propagation Society, 2006, 488 pages.

Kummer, Wolfgang H., "Basic Array Theory", Proceedings of the IEEE, vol. 80, No. 1, Jan. 1992, pp. 127-140.

Le Bihan, Nicolas, "The geometry of proper quaternion random variables", General Mathematics, Nov. 23, 2016, retrieved from arXiv:1505.06182v2 [math.GM] Nov. 23 2016, 14 pages.

Le Bihan et al., "Quaternion Subspace Method for Vector-Sensor Wave Separation", 2002 11th European Signal Processing Conference, Sep. 3-6, 2002, 4 pages.

Le Bihan et al., "Singular value decomposition of quaternion matrices: a new tool for vector-sensor signal processing", Signal Processing, vol. 84, 2004, pp. 1177-1199.

Liu, Wei, "Channel Equalization and Beamforming for Quaternion-Valued Wireless Communication Systems", Journal of Franklin Institute, Jun. 2, 2015, retrieved from arXiv:1506.00231v1 [cs.IT] May 31, 2015, 11 pages.

Ma et al., "Iterative Phase Reconstruction and Weighted Localization Algorithm for Indoor RFID-Based Localization in NLOS Environment", IEEE Sensors Journal, vol. 14, No. 2, Feb. 2014, pp. 597-611.

Manteghi, Majid, "Antenna element design and analysis", Mojix, Feb. 20, 2006, 25 pages.

Medina Sanchez, Rafael H., "Beam Steering Control System for Low-Cost Phased Array Weather Radars: Design and Calibration Techniques", University of Massachusetts—Amherst, Doctoral Dissertations 2014-current, Paper 117, May 2014, 220 pages.

Mills et al., "Alternating Sign Matrices and Descending Plane Partitions", Journal of Combinatorial Theory, Series A, vol. 34, 1983, pages 340-359.

Miron et al., "Quaternion-Music for vector-sensor array processing", IEEE Transactions on Signal Processing, Feb. 23, 2005, 26 pages.

Nehorai et al., "Vector-Sensor Array Processing for Electromagnetic Source Localization", IEEE Transactions on Signal Processing, vol. 42, No. 2, Feb. 1994, pp. 376-398.

Neumann et al., "Channel Estimation in Massive MIMO Systems", Information Theory, Mar. 31, 2015, retrieved from arXiv:1503.08691v1 [cs.IT] Mar. 30, 2015, 24 pages.

Nikitin et al. , "Phase Based Spatial Identification of UHF RFID Tags", IEEE RFID, 2010, pp. 102-109.

Orfanidis, Sophocles J., "Electromagnetic Waves and Antennas", Rutgers University, Jun. 1, 2004, retrieved from http://www.ece.rutgers.edu/~orfanidi/ewa/, 610 pages.

Rabinovich et al., "Typical Array Geometries and Basic Beam Steering Methods", Antenna Arrays and Automotive Applications, Chapter 2, 2013, pp. 23-54, DOI: 10.1007/978-1-4614-1074-4_2.

Seberry et al., "The Theory of Quaternion Orthogonal Designs", IEEE Transactions on Signal Processing, vol. 56, No. 1, 2008, pp. 256-265.

Seow et al., "Non-Line-of-Sight Localization in Multipath Environments", IEEE Transactions on Mobile Computing, vol. 7, No. 5, May 2008, pp. 647-660.

Siwen, Chen, "Non-Line-Of-Sight Localization in Multipath Environments", Thesis of Chen Siwen, 2014, 162 pages.

Skobelev, Sergei P , "Phased Array Antennas with Optimized Element Patterns", Artech House, 2011, 285 pages.

Tao et al., "Adaptive Beamforming Based on Complex Quaternion Processes", Hindawi Publishing Corporation, Mathematical Problems in Engineering, vol. 2014, Article ID 291249, Jun. 12, 2014, 11 pages, http://dx.doi.org/10.1155/2014/291249.

Via et al., "Properness and Widely Linear Processing of Quaternion Random Vectors", IEEE Transactions on Information Theory, vol. 56, No. 7, Jul. 2010, pp. 3502-3515.

Wang et al., "Polarimetric Detection for Vector-Sensor Array in Quaternion Gaussian Proper Noise", 2013 6th International Congress on Image and Signal Processing (CISP 2013), 2013, pp. 1164-1168.

Wiegmann, N. A., "The Structure of Unitary and Orthogonal Quaternion Matrices", Illinois Journal of Mathematics, vol. 2, Issue 3, 1958, pp. 402-407.

(56) References Cited

OTHER PUBLICATIONS

Wu et al., "Doa and Polarization Estimation Using an Electromagnetic Vector Sensor Uniform Circular Array Based on the ESPRIT Algorithm", Sensors, vol. 16, No. 2109, 2016, 20 pages, doi:10.3390/s16122109.

Wysocki et al., "Modeling Dual Polarization Wireless Fading Channels using Quaternions", IEEE, 2006, pp. 68-71.

Zhang et al., "Principles and Techniques of RFID Positioning", RFID Systems: Research Trends and Challenges, Chapter 15, 2010, 45 pages.

Zhang et al., "Quaternion-valued robust adaptive beamformer for electromagnetic vector-sensor arrays with worst-case constraint", Signal Processing, vol. 104, 2014, pp. 274-283.

Zoltowski et al., "Unitary Design of Radar Waveform Diversity Sets", Handbook on Array Processing and Sensor Networks, by Simon Haykin and K.J.R. Liu, Chapter 7, 2009, pp. 211-266.

\* cited by examiner

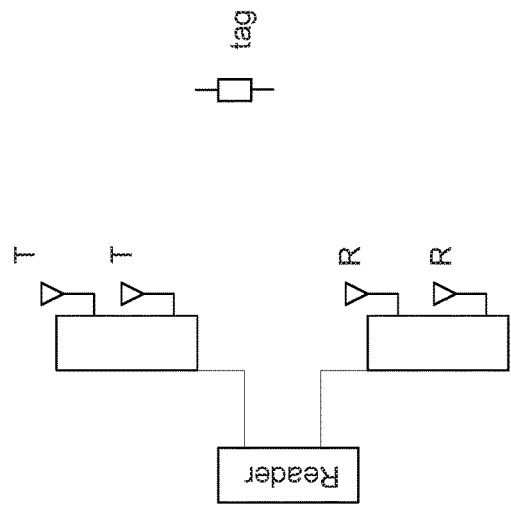
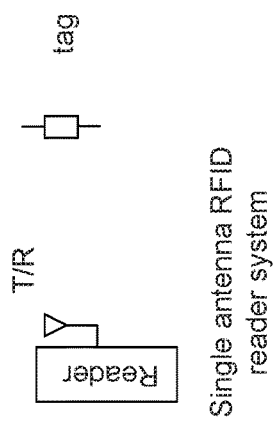

Micro-Location Tracking
Spread Spectrum: DSS

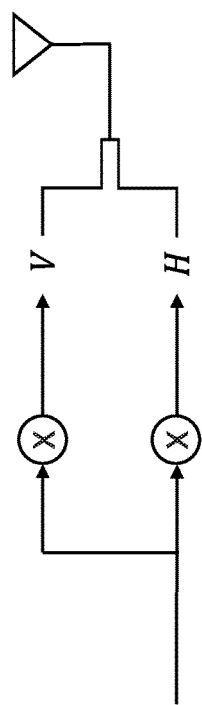

LOCATION ESTIMATION AND TRACKING FOR PASSIVE RFID AND WIRELESS SENSOR NETWORKS USING MIMO SYSTEMS

RELATED APPLICATIONS

The current application claims priority to U.S. Provisional Application No. 62/317,631 filed Apr. 4, 2016 entitled "Location Estimation and Tracking for Passive RFID and Wireless Sensor Networks," and U.S. Provisional Application No. 62/481,016 filed Apr. 3, 2017 the disclosures of which are incorporated by reference herein in their entirety.

FIELD OF THE INVENTION

Systems and methods in accordance with various embodiments of the invention relate to radio frequency identification (RFID) systems and more specifically to the ranging and localization of RFID tags using RFID systems that incorporate multiple transmit antennas.

SUMMARY OF THE INVENTION

Systems and methods for location estimation and tracking for passive RFID and wireless sensor networks in accordance with embodiments of the invention are disclosed. In one embodiment, a process for obtaining location information using an RFID reader system includes transmitting a combined interrogation and ranging signal from a plurality of antennas, where the ranging signal is a pseudorandom signal, receiving a backscattered return signal from an RFID tag at one or more receive antennas, extracting an information signal from the return signal and decoding the information signal to obtain RFID tag data, extracting a received ranging signal from the return signal, and estimating a range to the RFID tag based upon correlation between the ranging signal and the received ranging signal.

A further embodiment also includes generating an RFID interrogation signal waveform having a first frequency, generating a ranging waveform having a second frequency, where the second frequency is higher than the first frequency, combining the RFID interrogation signal and ranging waveform signal into a combined interrogation and ranging signal, splitting the combined interrogation and ranging signal to a plurality of transmit paths through a transmit array filter bank and modifying the signal in each transmit path using at least one transmit weighting factor, where each transmit weighting factor modifies a characteristic of the signal, and transmitting a first filtered output signal from each of the transmit paths of the transmit array filter bank using one of a plurality of transmit antennas in a first interrogation round.

Another embodiment also includes adjusting at least one of the at least one transmit weighting factor based upon the output of the equalizer filter bank and a plurality of the calculated time-of-arrivals of the plurality of received return signals, and transmitting a second filtered output signal from each of the transmit paths of the transmit array filter bank using one of the plurality of transmit antennas in a second interrogation round, where the second filtered output signal is modified using the adjusted at least one transmit weighting factor.

In a still further embodiment, adjusting at least one of the at least one transmit weighting factor includes applying machine learning to increase the correlation of the ranging signals.

In still another embodiment, adjusting at least one of the at least one transmit weighting factor includes applying machine learning to increase the read rate of the RFID tag.

In a yet further embodiment, receiving a backscattered return signal an RFID tag at one or more receive antennas includes receiving a plurality of backscattered return signals from an RFID tag at a plurality of antennas, and the method further includes combining the plurality of received return signals using an equalizer filter bank to produce a combined return signal, and the combining further includes modifying each received return signal using at least one receive weighting factor, where each receive weighting factor modifies a characteristic of the signal.

In yet another embodiment, combining the RFID interrogation signal and ranging waveform signal into a combined interrogation and ranging signal includes adding the two signals.

A further embodiment again also includes adjusting a characteristic of the transmitted combined interrogation and ranging signal in a subsequent interrogation round to increase read rate and ranging accuracy.

Another embodiment again also includes calculating the time-of-arrival of each of the plurality of received return signals.

BRIEF DESCRIPTION OF THE DRAWINGS

FIG. 1A is a system diagram illustrating an RFID reader system having a single transmit/receive antenna in accordance with embodiments of the invention.

FIG. 1B is a system diagram illustrating an RFID reader system having separate single transmit antenna and receive antenna in accordance with embodiments of the invention.

FIG. 1C is a system diagram illustrating an RFID reader system having two or more transmit antennas and two or more receive antennas in accordance with embodiments of the invention.

FIG. 7A is a system diagram illustrating an alternative transmit array configuration in accordance with embodiments of the invention.

DETAILED DESCRIPTION

Figure 1D:
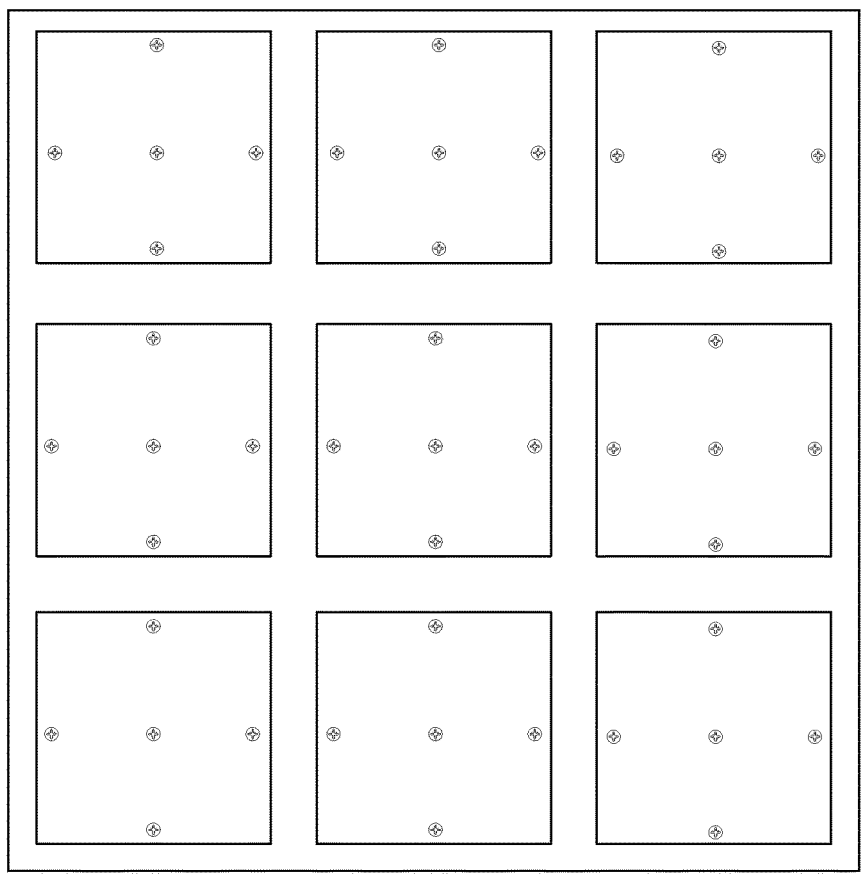
FIG. 1D is a photo showing an antenna array with nine antennas each having dual polarization that can be utilized in accordance with embodiments of the invention.

Turning now to the drawings, location estimation and tracking for passive RFID and wireless sensor networks in accordance with embodiments of the invention are disclosed. Radio-frequency identification (RFID) uses electromagnetic fields to retrieve information stored electronically on tags that are typically attached to objects. Passive RFID tags represent a distinct class of transmitter, because they harvest energy from a received interrogation signal and utilized harvested energy during transmission. As such, passive RFID tags often experience unstable timing. In particular, the symbol timing and phase of backscattered symbols can vary from one symbol to the next due to the impact of depletion of charge on timing circuitry within the passive RFID tag. Accordingly, RFID systems pose challenges (particularly in indoor multipath environments) that are not readily addressed by conventional communication system design techniques. FIGS. 1A, 1B, and 1C illustrate RFID reader systems having different architectures that can be utilized in various embodiments of the invention. FIG. 1A illustrates a single antenna RFID reader system that transmits and receives from the same antenna. FIG. 1B illustrates a two antenna RFID reader system having one transmit antenna and one receive antenna. FIG. 1C illustrates a multiple transmit antenna and/or multiple receive antenna RFID reader system that transmits from more than one transmit antennas and/or receives return signals at more than one receive antennas. Systems and methods in accordance with various embodiments of the invention can be utilized within any of a variety of additional RFID system architectures including (but not limited to) systems that utilize multiple transmit antennas and a single receive antenna element and/or systems that utilize the same array antenna for both transmitting interrogation signals and receiving signals backscattered by RFID tags. A nine element array of an RFID system that can be used to transmit combined interrogation and ranging signals in accordance with various embodiments of the invention is illustrated in FIG. 1D. As can readily be appreciated, a 3×3 array can be utilized to transmit signals or to transmit signals and receive signals backscattered by RFID tags.

In many embodiments of the invention, a ranging waveform is combined into an interrogation signal transmitted to an RFID tag by multiple antennas and recovered from the return signal received by at least one antenna from the RFID tag. A ranging estimate can be calculated using the returned ranging waveform to estimate the total distance traversed by the interrogation signal and return signal and thereby estimate the location of the tag. As is discussed further below, any of a variety of ranging signals can be utilized that can be backscattered by an RFID tag, where the backscattered signal can be utilized to determine path length. In many embodiments, the combined interrogation and ranging signal is transmitted by a plurality of antennas. In several embodiments, the polarization, amplitude, timing and/or phase of the transmitted signals transmitted by each antenna can be adjusted to maximize the power of the ranging signal backscattered by the RFID tag. In certain embodiments, an RFID tag can be repeatedly interrogated and adjustment made to the weightings applied to the transmitted combined interrogation and ranging signals to increase the accuracy of the ranging estimate determined using the received ranging signal backscattered by the RFID tag. In a number of embodiments, the RFID receiver system includes multiple antennas and the signals received at the antenna elements can be combined to increase the signal to noise ratio of the received signals. The combination of the received signals can also involve modification of the polarization, amplitude, phase, and/or delay of the received signals. In a number of embodiments, machine learning is utilized to determine the modifications applied to the received signals. In many embodiments, the modifications are applied based upon the estimated location of the RFID tag that backscattered the signals. As is discussed further below, any of a variety of techniques can be utilized to determine weightings for signals transmitted and received via multiple antennas as appropriate to the requirements of specific applications in accordance with various embodiments of the invention. Furthermore, the multiple antennas utilized to transmit and/or receive signals can be configured as a conventional antenna array with regularly spaced antenna elements and/or as a distributed array in which antenna elements are located in arbitrary locations (with known geometric relationships).

Figure 2:
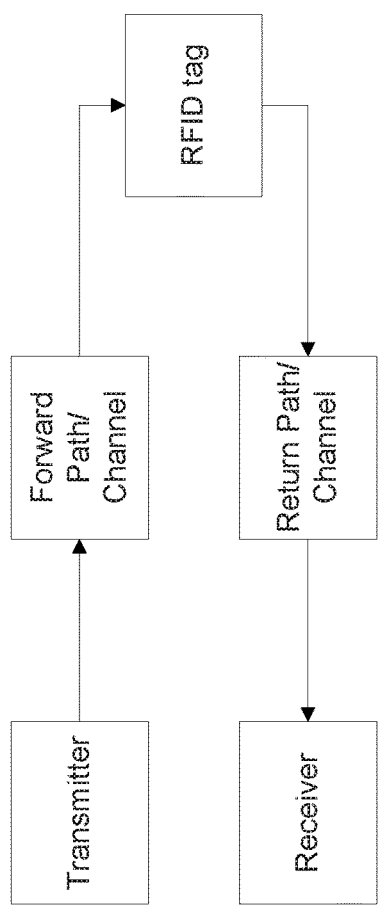
FIG. 2 is a system level overview illustrating an RFID reader system and tag and forward and reverse channels in accordance with embodiments of the invention.

The accuracy of a ranging estimate generated in accordance with an embodiment of the invention can be affected by distortions of the ranging waveform from when it is transmitted to when it returns to the RFID reader. Distortions can arise from frequency and time dependent systematic characteristics of the transmitter, receiver, and/or tag hardware and/or the medium through which the signals propagate. Furthermore, as a passive tag's stored power depletes, its transmitted signal typically attenuates. In the context of the following discussion, the term "channel" is used to refer to a communication channel (e.g. forward channel or reverse channel) and "compound channel" is used to refer to the transformation of the transmitted signal that occurs based upon the combined effects of the forward channel, backscattering of the transmitted signal by the tag hardware, and the reverse channel. FIG. 2 conceptually illustrates an RFID reader system configured to provide a ranging estimate in accordance with embodiments of the invention and the associated forward channel from the transmitter to the tag and return channel from the tag to the receiver.

In a number of embodiments, an initial round of RFID tag interrogations is performed using different frequencies and the received signals observed. The observed backscattered signal waveforms can be analyzed to determine a compound channel model for each tag. When an interrogation signal is combined with a ranging signal, the compound channel model can be utilized to remove the data modulated onto the interrogation signal by the RFID tag from the received signal backscattered by the RFID tag. The remaining signal is the received ranging signal that can then be utilized to determine the round trip distance between the reader antenna(s) and the RFID tag. In several embodiments, the ranging signal possesses characteristics that enable the determination of range with much greater precision than can be determined based upon group delay from transmitting the interrogation signal alone at multiple frequencies. In various embodiments of the invention, a frequency ranging signal can be any of a variety of signal types including, but not limited to, direct sequence spread spectrum (DSSS), ultra wideband (UWB), multitone frequency signaling in which tones are placed in nulls within the interrogation signal, continuous phase modulation (multi-h), continuous multi-frequency signaling and/or any other ranging signal appropriate to the requirements of a specific application. In many embodiments, multiple ranging signals are transmitted that include different ranging waveforms to provide a diversity of estimates that can be utilized to refine a ranging estimate. In a number of embodiments, the ranging signals can be provided as inputs to statistical models including (but not limited to) particle filters that enable the estimation of the most likely location of an RFID tag given the observed signals backscattered by the RFID tag.

Ranging Using RFID Systems

Figure 3A:
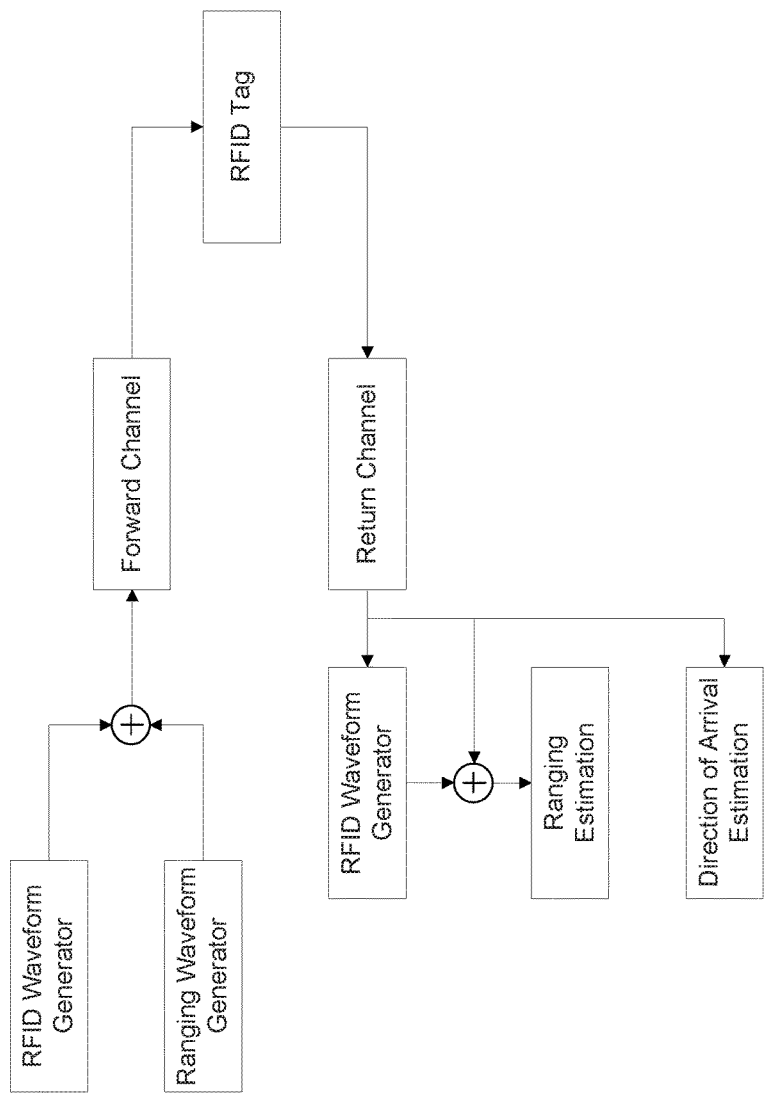
FIG. 3A is a system diagram illustrating components of an RFID reader system configured to provide a ranging estimate in accordance with embodiments of the invention.
Figure 3B:
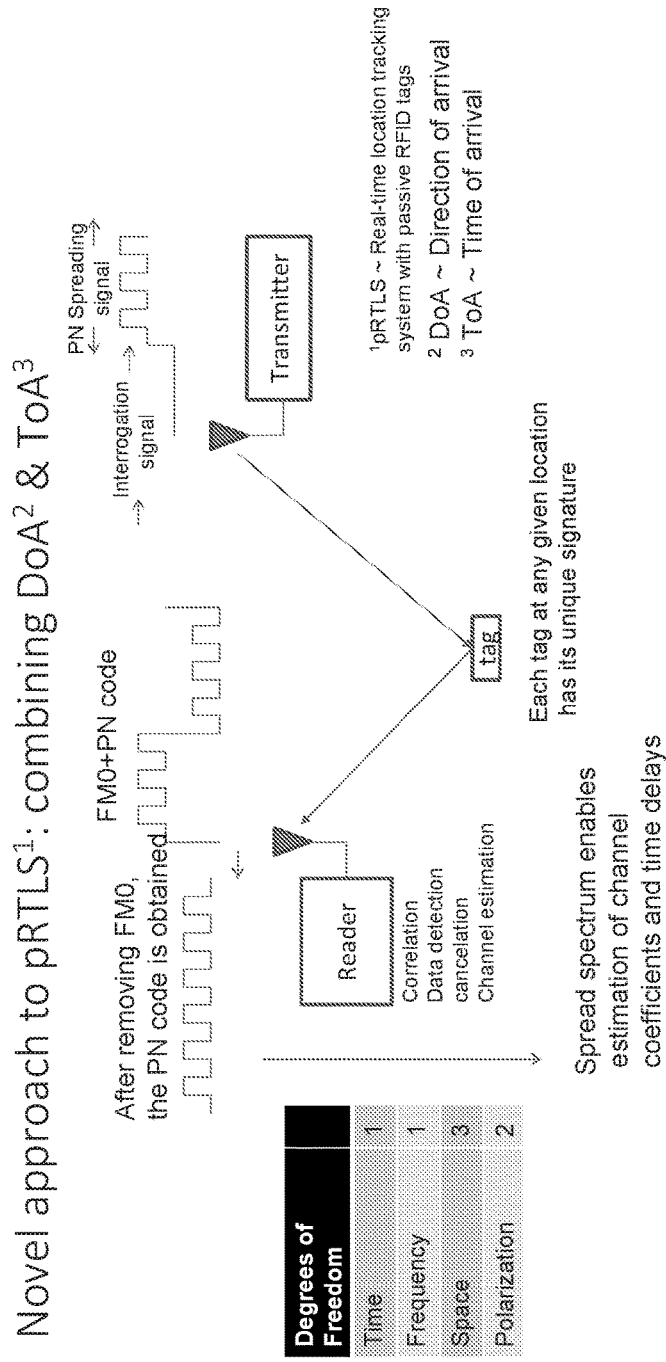
FIG. 3B conceptually illustrates an interrogation signal combined with a ranging signal for determining direction and/or time of arrival of a received signal from an RFID tag.
Figure 3C:
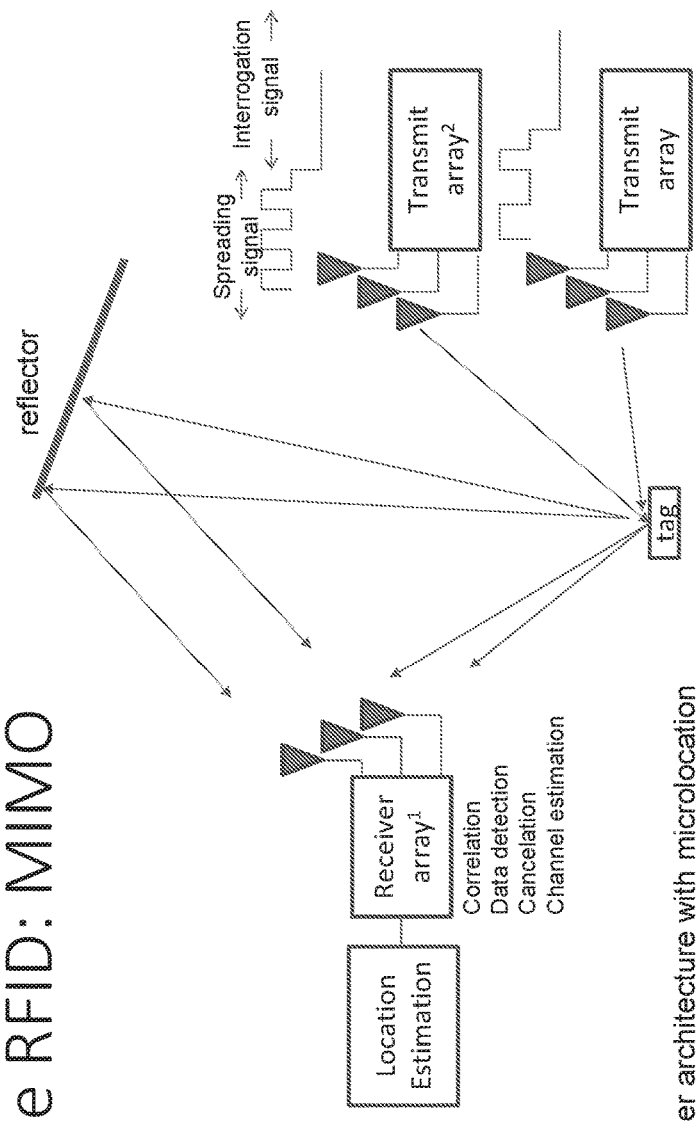
FIG. 3C conceptually illustrates the propagation of a signal from a multiple-input multiple-output (MIMO) transmit antenna array to a MIMO receive antenna array.

A system diagram illustrating components of an RFID reader system configured to provide a ranging estimate in accordance with embodiments of the invention is illustrated in FIG. 3A. The RFID reader system includes an RFID waveform generator to generate an interrogation signal and a ranging waveform generator to generate a ranging signal. An adder or combiner combines the two signals for transmission in the forward channel to the RFID tag. The backscattered return signal propagates through the return channel where a RFID waveform generator and ranging estimation block recovers the ranging signal. A direction of arrival estimation block can estimate the direction from which the return signal arrived at the receive antenna. FIG. 3B conceptually illustrates an interrogation signal combined with a ranging signal for determining direction and/or time of arrival of a received signal from an RFID tag. FIG. 3C conceptually illustrates the propagation of a signal from a MIMO transmit antenna array to a MIMO receive antenna array.

FIGS. 4A-4D illustrate graphs showing example interrogation signals using FM0 and Miller encoding in accordance with embodiments of the invention.

Figure 4A:
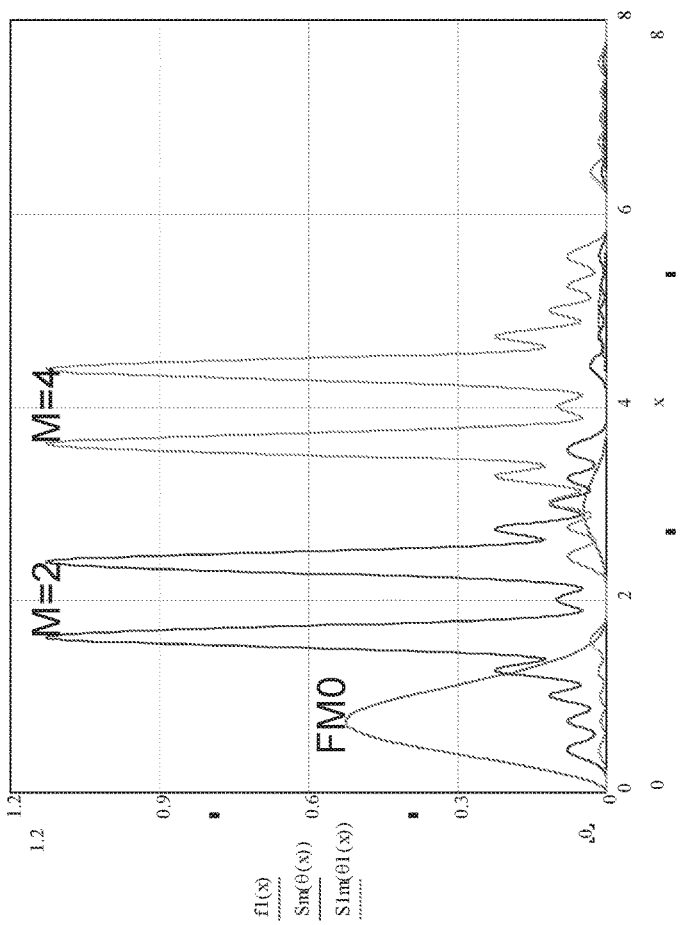
FIGS. 4A-4D illustrate graphs showing example interrogation signals using FM0 and Miller encoding in accordance with embodiments of the invention.
Figure 4B:
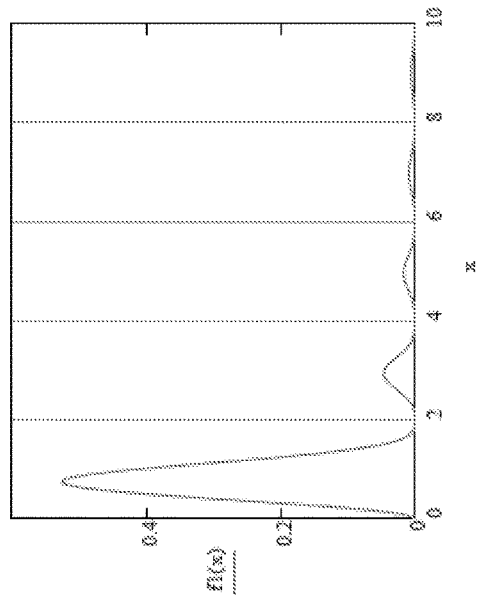
Figure 4C:
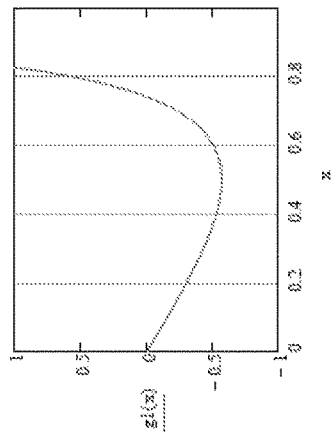
Figure 4D:
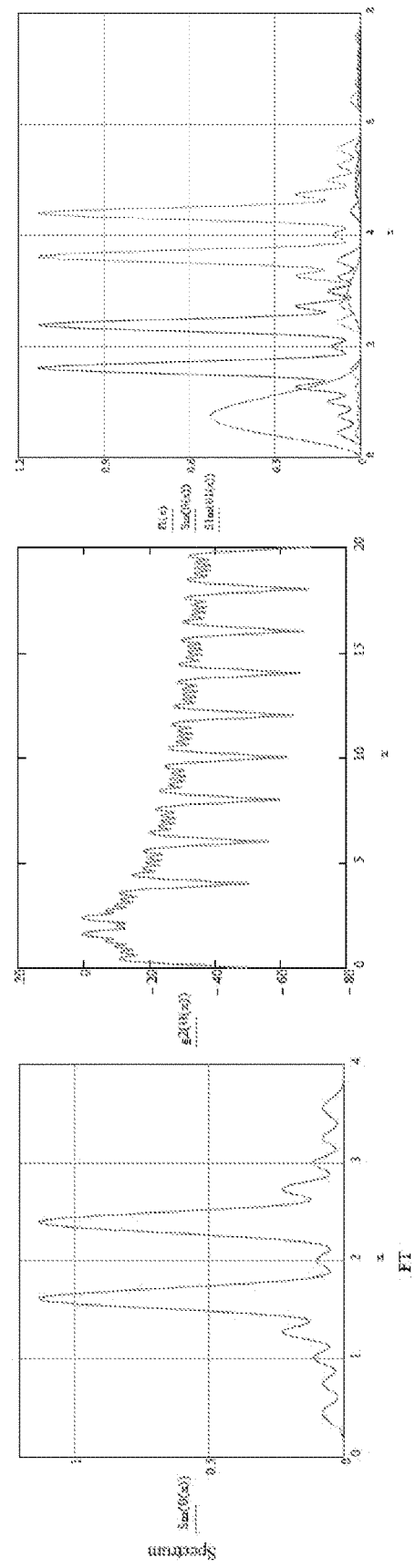
Figure 4E:
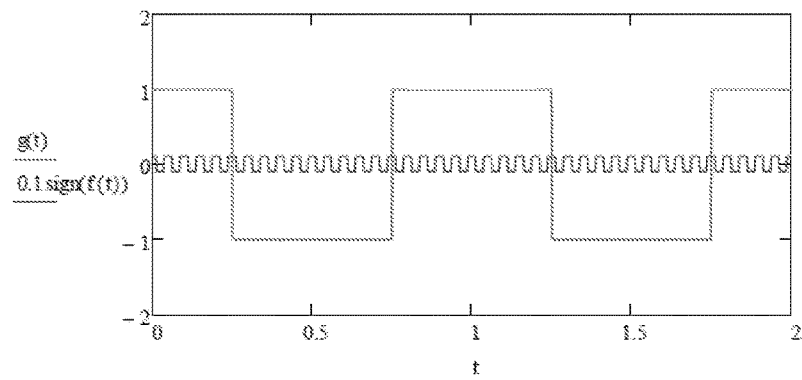
FIGS. 4E-4G illustrate graphs showing example ranging signals using direct sequence spread spectrum in accordance with embodiments of the invention.
Figure 4E:
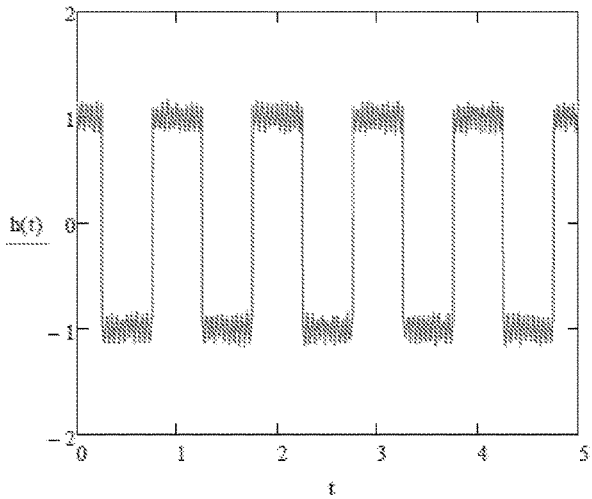
Figure 4F:
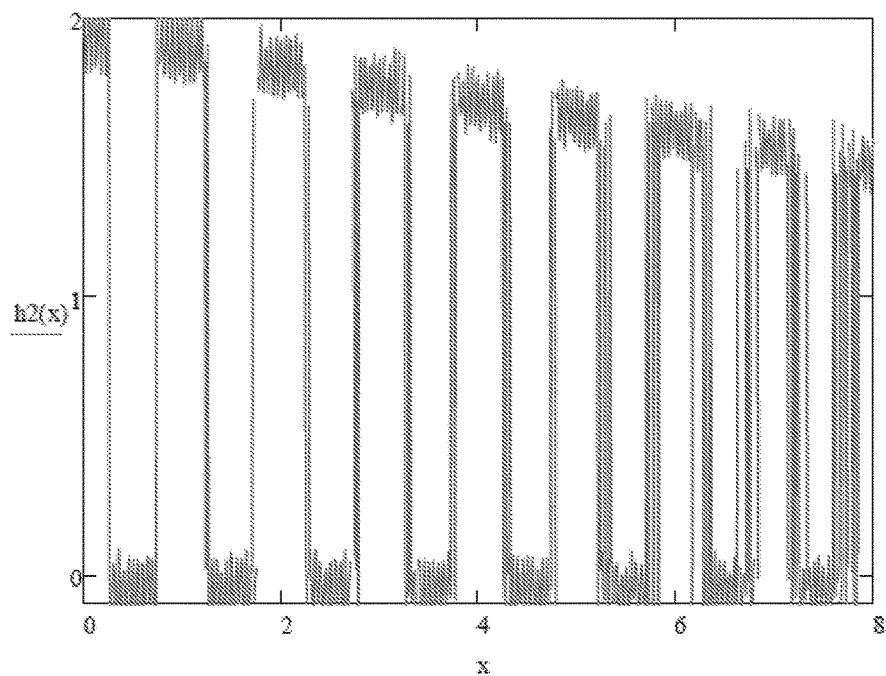
Figure 4G:
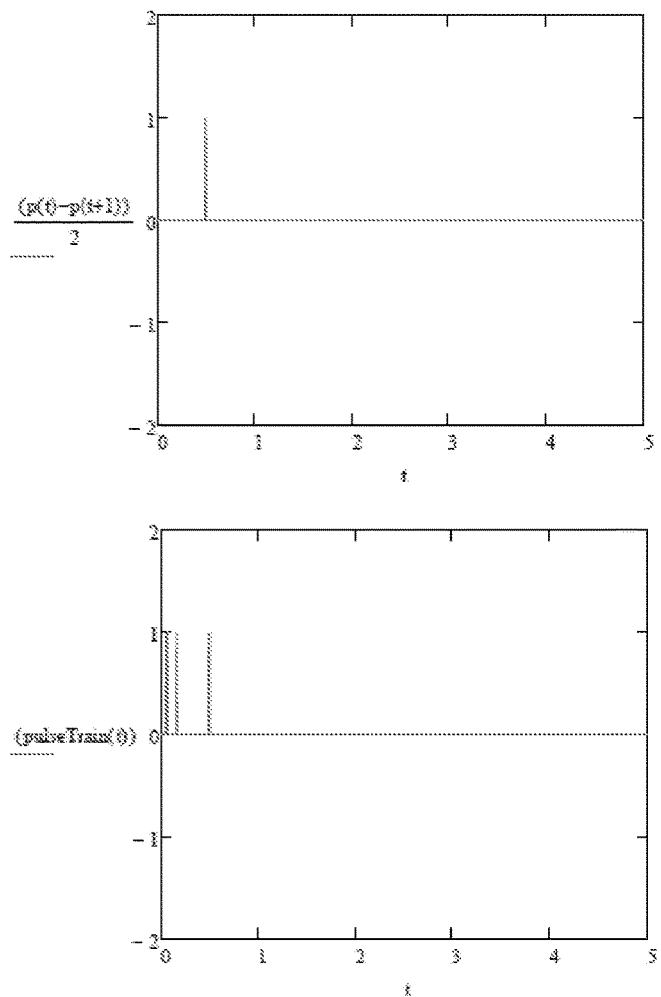

FIGS. 4E-4G illustrate graphs showing example ranging signals using direct sequence spread spectrum in accordance with embodiments of the invention.

RFID reader systems in accordance with many embodiments of the invention may include multiple transmit antennas and/or receive antennas. In several embodiments, an RFID reader system includes four transmit antennas and four receive antennas. In RFID reader systems that include multiple transmit antennas and multiple receive antennas, the ranging signal can be encoded using one or more space-time-frequency-phase-polarization (STFPP) code. As discussed below, space time STFPP codes yield highly correlated signals at a correct range hypothesis in multiple input multiple output (MIMO) communication systems. Similar to a space-time code, STFPP codes specify one or more characteristics of a signal (space, time, frequency, phase, and/or polarization) to vary in transmitting multiple copies of the signal from multiple antennas. Specific STFPP codes and the manner in which they can be utilized to recover ranging information in accordance with a number of embodiments of the invention are discussed further below.

RFID reader systems in accordance with embodiments of the invention may utilize a phased antenna array and/or a distributed antenna array such as the various arrays described in U.S. Pat. No. 8,768,248 entitled "RFID Beam Forming System" to Sadr, the disclosure from which relevant to antenna arrays having multiple elements is hereby incorporated by reference in its entirety.

RFID reader systems in accordance with embodiments of the invention may utilize distributed antennas such as those described in U.S. Pat. No. 8,395,482 entitled "RFID systems using distributed exciter network" to Sadr et al., the disclosure from which relevant to distributed antenna architectures is hereby incorporated by reference in its entirety.

The reading of RFID tags can involve timing and phase uncertainty in the backscattered signal returned from a tag. Several RFID reader systems in embodiments of the invention can detect timing and phase uncertainty using techniques such as those described in U.S. Pat. No. 7,633,377 entitled "RFID Receiver" to Sadr, the disclosure from which relevant to detecting time and phase uncertainty of a backscattered signal is hereby incorporated by reference in its entirety.

RFID tag location may be determined using phase differences and frequency differences as described in U.S. Pat. No. 8,072,311 entitled "Radio frequency identification tag location estimation and tracking system and method" to Sadr et al. and/or using the various statistical modelling techniques also disclosed in U.S. Pat. No. 8,072,311, the disclosure from which relevant to tag location estimation is hereby incorporated by reference in its entirety.

Systems and methods for performing ranging and determining the location of RFID tags in accordance with various embodiments of the invention are discussed further below.

Interrogation Phase

Figure 5:
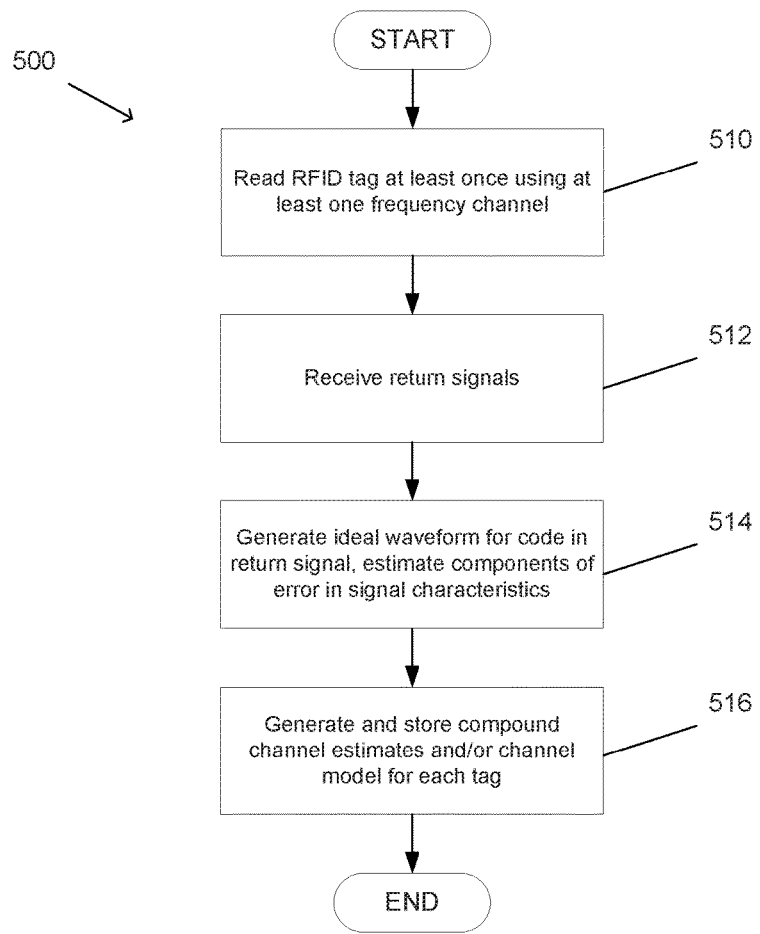
FIG. 5 is a flow chart illustrating a process for collecting compound channel characteristics in accordance with embodiments of the invention.

In several embodiments, the process of obtaining range information to a particular RFID tag includes a first phase involving developing a compound channel model for the RFID tag and then a second phase involving using the compound channel model to estimate the round trip distance from the RFID reader antenna(s) to the RFID tag. In many embodiments, a first phase is referred to as the inventory phase. In the inventory phase, one or more tags are read multiple times at different frequencies using an interrogation signal that may not include a ranging waveform. Characteristics of the difference between a return signal received from the tag(s) and an ideal waveform can be stored as compound channel estimates that are indicative of the characteristics of the forward and receive channels and backscattering by the RFID tag itself. In several embodiments, a return signal is the backscattered signal received from the RFID tag. A process 500 for reading one or more tags in an inventory phase in accordance with several embodiments of the invention is illustrated in FIG. 5.

The process 500 includes reading (510) one or more RFID tags. Each read includes an RFID reader system transmitting an interrogation signal to an RFID tag and receiving a backscattered return signal from the RFID tag. In many embodiments, an RFID tag is read multiple times using different frequencies. In various embodiments, the RFID reader system may utilize a single transmit/receive antenna, a single transmit antenna and a single receive antenna, a single transmit antenna and multiple receive antennas, multiple transmit antennas and a single receive antenna, or multiple transmit antennas and multiple receive antennas. In many embodiments, the tags store and/or backscatter information in accordance with the Electronic Product Code (EPC) Gen 2 standard published by GS1 AISBL, a non-profit association registered in Belgium, the disclosure of which is hereby incorporated by reference in its entirety. In other embodiments, information may be stored in any of a variety of formats and/or any of a variety of communication protocols can be utilized to transmit information to/from the RFID tag as appropriate to a particular application.

The backscattered return signal is received (512) and the code within the signal is decoded. An ideal waveform is synthesized (514) for the recovered code. The difference between the ideal waveform and the received return signal provides components of characteristics of the compound channel from the transmitter to the tag to the receiver. The amplitude, phase, and I and Q component imbalances can be extracted (516) for each tag read at the given frequency. The compound channel estimates for each tag being read over different frequency channels can be stored in a channel management database or similar storage. The compound channel estimates can be used to train machine learning algorithms in synthesizing a reference waveform that accounts for the characteristics of the compound channel and/or to estimate the distance of the tag from the reader as will be discussed below. Although specific processes for generating compound channel estimates in accordance with embodiments of the invention are discussed above with reference to FIG. 5, any of a variety of processes may be utilized as appropriate to a particular application.

Ranging Phase

Figure 6:
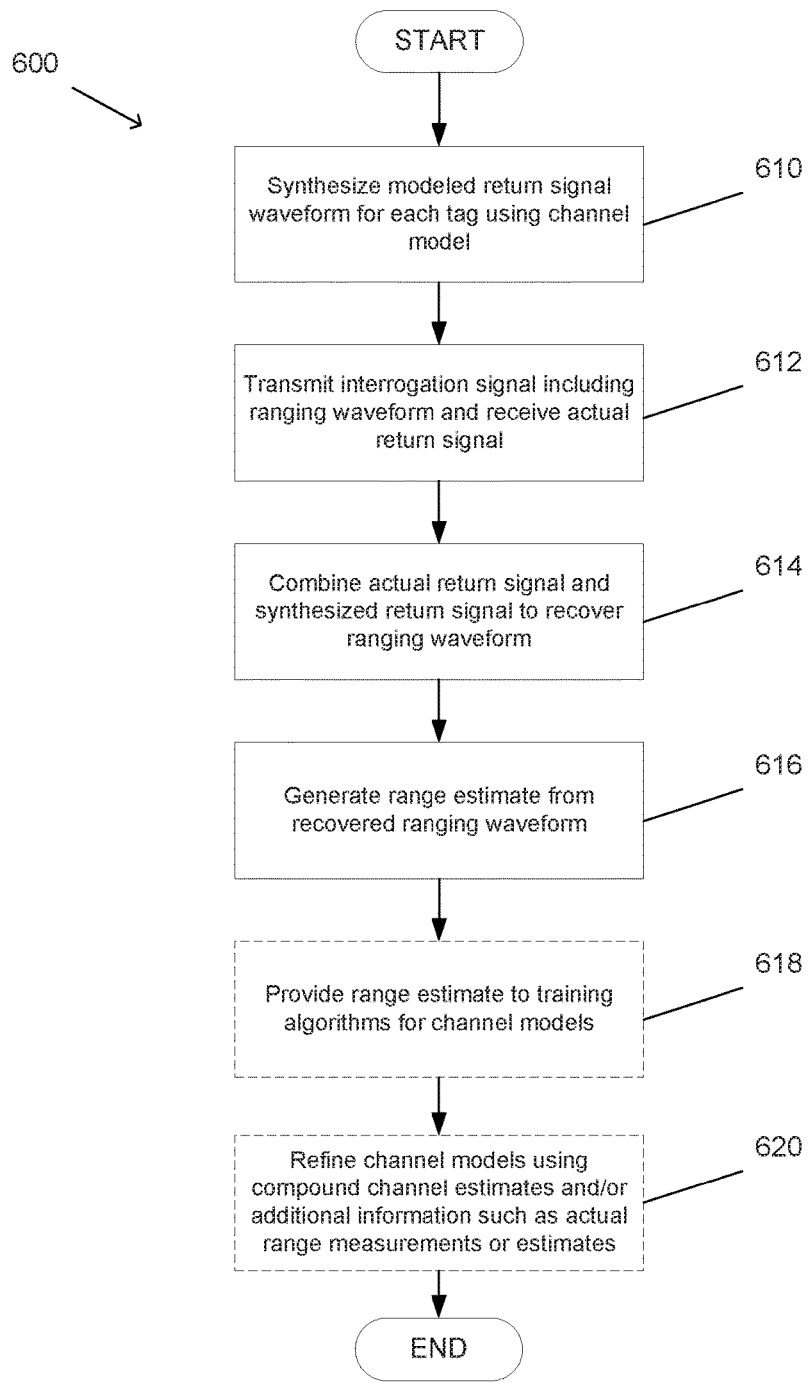
FIG. 6 is a flow chart illustrating a process for generating a ranging estimate using compound channel characteristics and a ranging signal in accordance with embodiments of the invention.

In several embodiments, a second phase is referred to as the ranging phase. A process 600 for ranging an RFID tag in accordance with embodiments of the invention is illustrated in FIG. 6.

The process 600 includes synthesizing (610) a model return signal waveform for a tag using compound channel estimates so that the waveform compensates for systematic error in the compound channel. An interrogation signal including a ranging waveform can be sent to the tag and the actual backscattered return signal is received (612). The received return signal is compared to the synthesized return signal and the ranging waveform is recovered (614) from the difference between the signals. I and Q components of a signal can be replicated from I and Q samples taken during the interrogation phase. In several embodiments, the synthesized return signal is generated for a particular EPC code (e.g., a specific data payload) that is used for the inventory and ranging phases. Comparison of the signals can be made in time (e.g., using a finite impulse response filter) or frequency (e.g., using a fast Fourier transform) domains to recover the ranging waveform. For example in the frequency domain, a fast Fourier transform (FFT) can be performed with zero weights and then an inverse FFT performed to cancel out the data payload of the signal. As can readily be appreciated, the received signal can also be utilized to extract data backscattered by the RFID tag as a separate process to the extraction of the ranging signal.

A range estimate for the distance from the transmit antenna to the tag to the receive antenna can be generated (616) from the received ranging waveform. In some embodiments, the range can be determined by measuring the round-trip time of the signal from transmit to receive. In other embodiments, the range can be determined from the difference in phase of two received signals returned from interrogation signals at two frequencies. The specific technique utilized is largely dictated by the specific ranging waveform transmitted by the RFID receiver.

In several embodiments, the range estimates can be provided (618) to machine learning processes to refine the compound channel estimates.

Although specific processes for determining the range of an RFID tag in accordance with embodiments of the invention are discussed above with reference to FIG. 6, any of a variety of processes may be utilized as appropriate to a particular application.

Range Estimates Using Multiple Antennas

Multiple-input and multiple-output (MIMO) radio architectures utilize multiple transmit and/or receive antennas to exploit multipath propagation. Because of the standing wave phenomenon, a transmitted interrogation signal can have nulls at certain locations and tags at those locations may not respond. Therefore, repeating transmissions with different characteristics of the interrogation signal such as polarization and phase and transmitting multiple signals from different transmit antennas can be useful in reducing the number of null locations. Transmit arrays and distributed exciters that can be used for MIMO interrogation include those described in U.S. Pat. No. 8,395,482 to Sadr et al., the disclosure from which relevant to activating RFID tags using multiple transmit antennas and constructing RFID receiver systems utilizing distributed architectures is hereby incorporating by reference in its entirety.

In many embodiments of the invention, an RFID reader system includes N transmit antennas and M receive antennas. The antennas can be used for multiple reads of a tag to find the best estimate for the range of the tag. A set of transmit antennas may be configured in an array (e.g., a near-field array) or distributed throughout an area. Similarly a set of receive antennas may be configured in an array or distributed throughout an area.

Space-time code (STC) methods can be used to determine waveforms to transmit at different transmit antennas to provide peak correlation when a range hypothesis correctly estimates the distance of the tag from the various antennas. A matrix of waveforms in space-time coding can be designed so that elements of the matrix are orthogonal. In several embodiments, code design can utilize a virtual array of N by M antennas. Each of the M virtual arrays includes a receive antenna and the entire set of N transmit antennas. Algorithms that can be used to design appropriate space-time codes include those discussed in U.S. Provisional Application No. 62/317,631, incorporated by reference above. The process of determining what signal each antenna should transmit at each time t can be referred to as Algorithm Ranging Code Design. While space-time codes can provide significant improvements in ranging resolution, any of a variety of techniques can be utilized to determine the delay between a transmitted and received signal including the use of an array of matched filters that each include small time shifts to enable a precise alignment of a transmitted and oversampled received signal that yields a maximum correlation and/or a correlation that satisfies an appropriate threshold. As can readily be appreciated, the specific technique utilized to detect the delay between transmission and receipt of a backscattered signal is largely dependent upon the requirements of a given application. As is discussed further below, antennas that include multiple ports enabling transmission using different polarizations also enable the adjustment of antenna polarizations to improve the peak received power of a received ranging signal backscattered by an RFID tag. MIMO RFID tag ranging and interrogation techniques in accordance with various embodiments of the invention are discussed further below.

Background to MIMO Tag Interrogation

A fundamental practical challenge in the application of sensors attached to objects is the location of the antenna of the sensor with respect to the reader/interrogator antenna. Specifically, energy harvesting efficiency of passive sensors and RFID tags is highly dependent on the angle of incident wave with respect to the position of the antenna of the sensor device. For example if the sensor antenna is 2-dimensional and the sensor antenna is vertically positioned with respect to overhead reader antenna radiating vertically, there may not be sufficient exposure of a sensor's antenna surface to harvest sufficient energy to communicate.

Another challenge is standing wave phenomenon, where at a fixed frequency and stationary sensor field in a rich scattering environment, electromagnetic waves superimpose constructively and destructively. In the latter case, when adding destructively, the flux density radiated from a fixed reader antenna exhibits nulls in the energy density at random positions, spaced at fractions of the wavelength within the physical space in the field of view of radiating antenna. The net effect of this phenomena can also result in passive sensors failing to harvest enough energy turn on and communicate with the reader system.

With respect to sensor/RFID tag antenna positions, polarization mismatch can also present a further challenge to deliver sufficient energy to the sensor, accentuated further in non-line-of-sight (NLOS). Systems and methods in accordance with many embodiments of the invention can overcome these limitations to detect and process the payload from the sensor device, but also identify the location of the device.

In many embodiments, both transmitter and receiver antennas of the RFID reader system are dually polarized. That is either having left and right polarization for circular polarization, or else vertical and horizontal polarization for linear polarization.

In applications where there is NLOS with the sensor and a rich scattering environment, classical transmit beamforming with maximizing the power in the look direction (e.g., using a steering vector) of the array can fail due to presence of multipath in the forward channel (i.e., from the transmitter to the tag), due to obstructions between the RFID tag and reader transmitting antenna. In some of these cases it can be desirable to "steer" the beam in such a manner to deliver maximum power to the tag antenna. In the receive array, it can be desired to add all the signal components (from both polarizations of each antenna element) constructively, however, in a multipath environment the received signal is the superposition of the Cartesian product of all possible paths from the transmit array to the sensor and from the sensor backscattered signal to the receive antenna(s).

For addressing these limitations systems and methods in accordance with various embodiments of the invention can utilize one or more of the following approaches:

Diversity in: Space (transmit and receive antenna arrays), Time (by querying the sensor many times), Frequency (by using different frequency channels for different query rounds and/or different antennas), Phase (by varying the phase for different query rounds and/or different antennas), and/or Polarization (employing dually polarized antenna)

Ranging signal to make accurate measurements of time difference of arrival (TDOA) of the signal at the receiver array "Analysis by synthesis" method to iteratively perturb the phase, and/or amplitude for each polarization (collectively referred to hereinafter as weighting) of each transmit antenna element, observe the underlying behavior of the synthesized signal at the receiver, and use adaptive signal processing and/or machine learning techniques to adapt the transmit antenna weighting for the next query cycle. Beamforming coefficients can be used as initial weights.

MIMO Channel and Signal Model

The channel model for dual polarized antennas is typically described using four complex coefficients. Quaternions can be used to describe the channel by a single quaternion number. For example, see B. J. Wysocki, T. A. Wysocki, and J. Seberry, "Modeling Dual Polarization Wireless Fading Channels using Quaternions," IEEE, 1-4244-0368-5/06, 2006, the portions of which relevant to quaternion representation of dual polarized antennas are hereby incorporated by reference in their entirety. In general, let $x^H(t)$ represent horizontal polarization with superscript H and $x^V(t)$ the vertical polarization respectively. The relationship between the complex valued channel model and quaternion channel model is as follows:

$$Re(h^{HH})=Re(h^{VV})=q_1$$

$$Im(h^{HH})=-Im(h^{VV})=q_2$$

$$-Re(h^{VH})=Re(h^{HV})=q_3$$

$$Im(h^{VH})=Im(h^{HV})=q_4$$

$$q=q_1+q_2i+q_3j+q_4k$$

where Re( ) is the real part and Im( ) is the imaginary part, h is complex channel coefficient (for transmit/receive patch pair), and q represents the quaternion of channel coefficients.

The above represents the channel impulse response from a horizontal or vertical transmit antenna to a horizontal or vertical antenna. Using quaternions simplifies the representation of the polarization so that each patch is represented by a single quaternion as opposed to two separate channel impulses.

Assume that the electromagnetic planewave traveling is represented by $$g(t) = \begin{pmatrix} g^H(t) \\ g^V(t) \end{pmatrix} = \begin{pmatrix} \begin{pmatrix} a^H(t) & e^{j\varphi^H(t)} \\ a^V(t) & e^{j\varphi^V(t)} \end{pmatrix} \end{pmatrix} s(t)$$

Let $\theta \in [0, 2\pi]$ and $\varphi \in [0, \pi/2]$ be the azimuth and elevation angle of the transmitted/received signal and two angles $\gamma \in [0, \pi/2]$ and $\eta \in [0, 2\pi]$ be the polarization auxiliary angle and polarization phase difference. The output of the transmit (Tx) array of the i-th element is $$x_i(t)=a(\theta_i,\varphi_i,\gamma_i,\eta_i,\beta_i)S_i(t)+n(t)$$

where $a(\theta, \varphi, \gamma, \eta, \beta)$ is a quaternion valued function and n(t) is quaternion valued additive white Gaussian noise (AWGN).

Systems for Estimating Range Using Multiple Antennas

Figure 7:
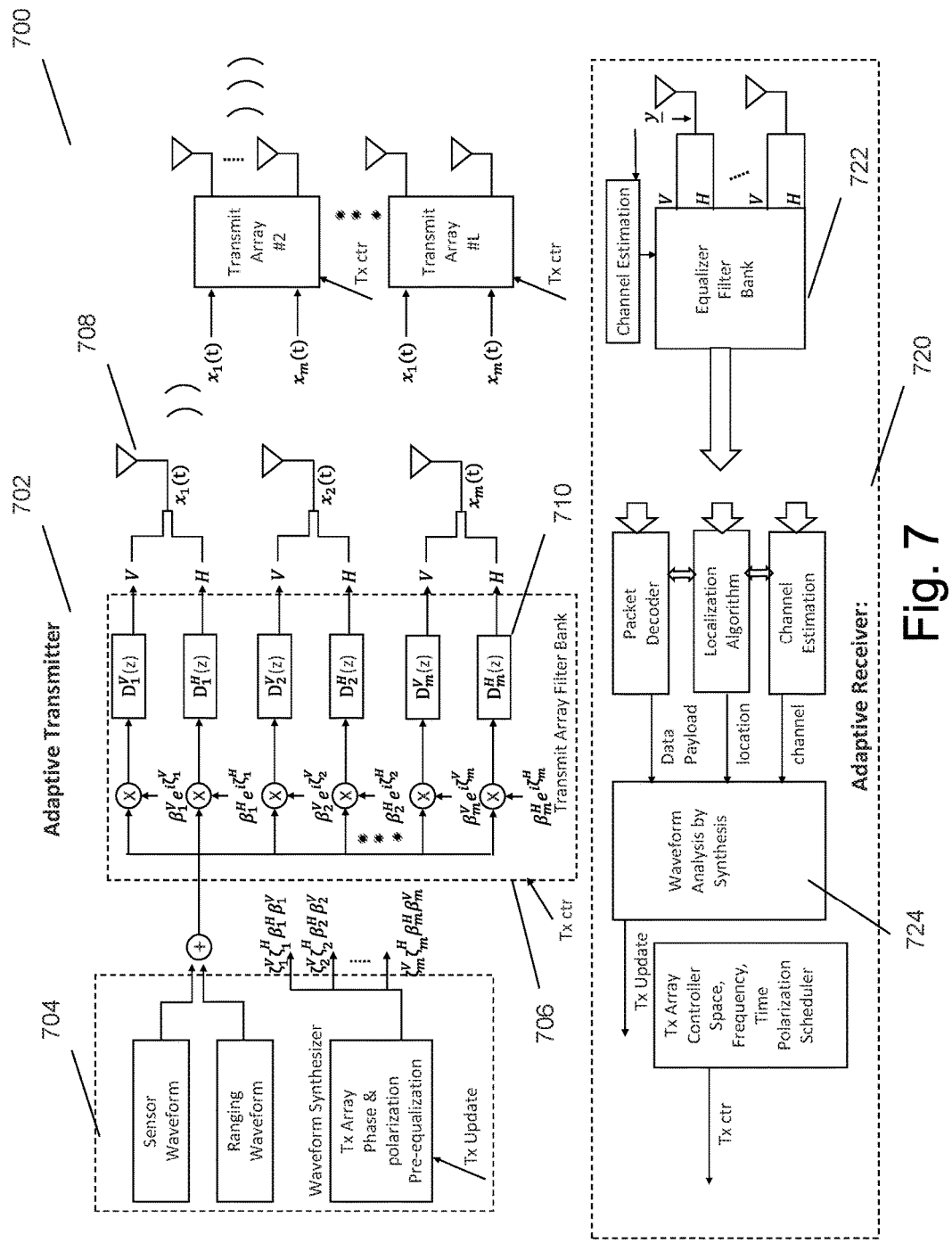
FIG. 7 is a system diagram illustrating components of a MIMO RFID reader system for generating a ranging estimate in accordance with embodiments of the invention.

In many embodiments of the invention, a location estimation RFID reader system includes a transmitter having at least two transmit antennas and a receiver having at least two receive antennas. A location estimation RFID reader system that may be utilized in accordance with several embodiments of the invention is illustrated in FIG. 7. In the illustrated embodiment, the transmitter 702 of the reader system 700 includes a waveform synthesizer 704, a transmit array filter bank 706, and transmit antennas 708 that can be arranged in one or more transmit antenna arrays #1, #2, . . . L.

In many embodiments, the waveform synthesizer 704 is configured to generate an interrogation signal waveform. In several embodiments, the waveform synthesizer 704 generates an interrogation signal as a sensor waveform in accordance with a standard for RFID systems such as (but not limited to) the EPC Gen 2 protocol. The interrogation signal may utilize any of a variety of types of encoding schemes appropriate for tag activation, such as FM0 or Miller. In further embodiments, the waveform synthesizer 704 is configured to generate a ranging signal waveform, such as those described further above.

The transmit array filter bank 706 includes two or more transmit signal paths 710 to which the combined interrogation and ranging signal is distributed. Each transmit signal path 710 individually processes the combined interrogation and ranging signal using transmit weighting factors for each transmit signal path 710. Transmit weighting factors can include, but are not limited to, frequency, phase, amplitude, and/or delay. Additional variations can include timing (e.g., which antennas transmit in which interrogation round) and/or polarization (which polarization to transmit the signal, e.g., horizontal or vertical, left or right circular). Transmit weighting factors may be updated for subsequent interrogation rounds as discussed in greater detail further below.

Each transmit signal path 710 is connected to a transmit antenna. In the illustrated embodiment, a pair of transmit paths for horizontal and vertical polarization are connected to ports for horizontal and vertical polarization of a transmit antenna. Similarly, other transmit antennas have pairs of horizontal and vertical transmit paths leading to them. In other embodiments, a transmit signal path can be connected in different ways to a transmit antenna to direct the polarization of the signal when it is transmitted from the antenna. In many embodiments, a single polarization of each receive antenna is utilized.

The receiver 720 of the reader system 700 includes an equalizer filter bank 722 and a waveform analyzer 724. The equalizer filter bank 722 combines the signals received from multiple antennas into a single signal. The waveform analyzer 724 can be used to decode the data payload from the signal, estimate location using the embedded ranging signal, and/or perform channel estimation based on an inventory round of interrogations. The operation of an RFID receiver that may be utilized in accordance with various embodiments of the invention is described in U.S. Pat. No. 7,633,377 entitled "RFID Receiver" to Sadr and U.S. Pat. No. 8,768,248 entitled "RFID Beam Forming System" to Sadr, the relevant portions of which are hereby incorporated by reference in their entirety.

Processes for Estimating Range Using Multiple Antennas

Figure 8:
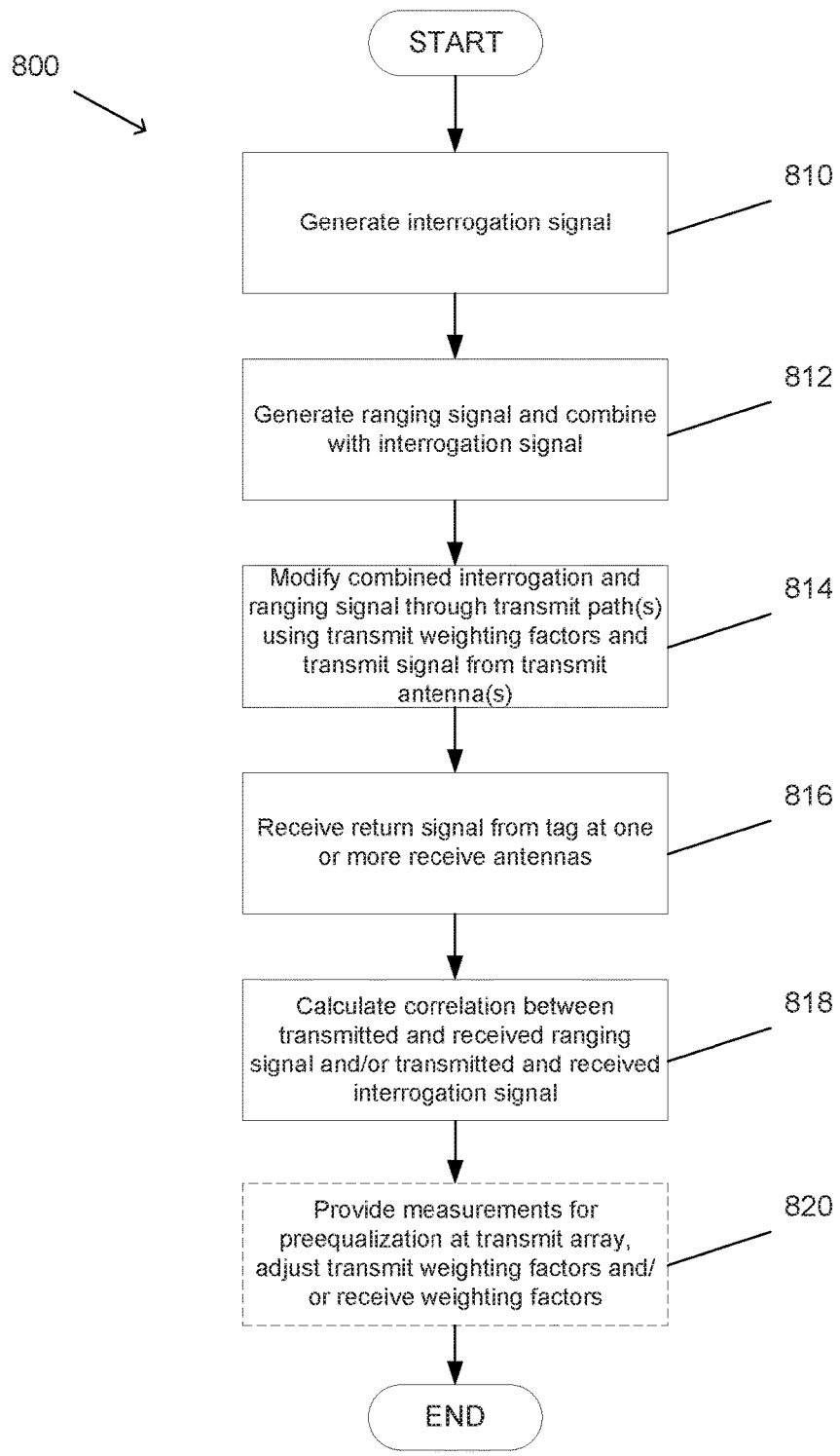
FIG. 8 is a flow chart illustrating a process for generating a ranging estimate using a MIMO RFID reader system and a ranging signal combined with an interrogation signal in accordance with embodiments of the invention.

In many embodiments of the invention, a process for estimating range to an RFID tag can utilize multiple transmit antennas to send multiple copies of an interrogation signal that includes an embedded ranging signal. A process for transmitting multiple interrogation signals to determine range in accordance with embodiments of the invention is illustrated in FIG. 8. The process 800 includes generating (810) an interrogation signal waveform. In many embodiments, the interrogation signal waveform conforms with the EPC Gen 2 standard. In further embodiments, the interrogation signal waveform utilizes FM0 encoding, while in still other embodiments it utilizes Miller encoding.

The process includes generating (812) a ranging signal waveform. In many embodiments, the ranging signal waveform is a pseudo-random signal. Types of signals that can be utilized for a ranging signal in accordance with various embodiments of the invention include, but are not limited to, direct sequence spread spectrum (DSSS), ultra wideband (UWB), multitone frequency signaling in which tones are placed in nulls within the interrogation signal, continuous phase modulation (multi-h), continuous multi-frequency signaling and/or any other ranging signal appropriate to the requirements of a specific application. In several embodiments, the ranging signal waveform is optimized by being based on a previous channel measurement of the same tag in a previous query cycle.

The interrogation signal waveform and ranging signal waveform are combined (812). In many embodiments, the signals are added together. The combined interrogation and ranging signal is provided (814) to transmit signal paths for each polarization of each antenna. In several embodiments, each antenna has input ports for horizontal and vertical polarization. One or both may transmit at the same time.

The transmit paths of the filter bank operates on each I and Q signal of each element for optimized phase rotation and amplitude weighting using transmit weighting factors. Each polarization is induced on each polarization rail that can be represented $Z(t)$ by a quaternion at the output of each antenna element. As will be discussed in greater detail further below, machine learning and other techniques can be used to update transmit weighting factors from query round to query round with a goal of maximizing the peak correlation of the transmitted and received ranging signals. As is discussed further below, a ranging signal with a narrow peak autocorrelation can be utilized. When weightings are appropriately applied, the peak correlation between the received ranging signal and the transmitted ranging signal is increased and the width of the peak can be narrow, enabling accurate range estimation. In a number of embodiments, beamforming coefficients can be used as initial weighting factors and these weighting factors are adjusted in an effort to increase peak correlation until one or more appropriate stopping criteria are satisfied.

The interrogation and ranging signal activates an RFID tag that returns a backscattered return signal. Backscattered return signals are received (816) at one or more receive antennas. In several embodiments, the receive array processes a signal, that can be represented as a quaternion, by optimal phase rotation as estimated by simultaneously considering the transmit weighting factors (e.g., phase and/or polarization). In further embodiments, measurements are provided for preequalization of the signals at the transmit array. When there are more than one receive antennas, the signals received at the antennas can be combined using receive weighting factors. The weighting factors utilized to perform the combination can be similar to those outlined above with respect to the weightings applied to the transmitted signal.

The correlation is found (818) between the interrogation signal generated at the transmitter and the received interrogation signal portion extracted from the received signal and/or between the ranging signal generated at the transmitter and the received ranging signal portion extracted from the received signal.

In several embodiments, machine learning or other techniques based upon the radiometric data can be used to update transmit weighting factors and/or receive weighting factors based upon the received radiometric data and/or a ground truth of reading tags in known locations. The use of machine learning is discussed further below.

Here, analysis by synthesis is useful to singulate on a specific sensor to de-noise the location measurement for each iteration. When transmit and receive reader antennas are the same (typically referred to mono-static operation). The location algorithm entails solving for the distance from the tag to the reader. When operating in bi-static mode, where separate receive and transmit antennas are used, the distance of transmit antenna to the tag and tag to the receive antenna is obtained. RFID reader systems in accordance with embodiments of the invention may utilize distributed antennas such as those described in U.S. Pat. No. 8,395,482 entitled "RFID systems using distributed exciter network" to Sadr et al., incorporated by reference above. With multiple transmit antennas in distributed excitation methodology, the location of tag can be inferred from distance measurement from each antenna. RFID tag location may be determined using phase differences and frequency differences as described in U.S. Pat. No. 8,072,311 entitled "Radio frequency identification tag location estimation and tracking system and method" to Sadr et al., incorporated by reference above. In many embodiments, the ranging signal enables much more precise phase and/or delay estimates than can be obtained by comparisons of the interrogation signal. Accordingly, embedding the lower amplitude ranging signal within the interrogation signal can achieve significant improvement in ranging resolution.

While specific processes are described above with respect to FIG. 8, one skilled in the art will recognize that any of a variety of processes may be utilized for ranging estimates in accordance with embodiments of the invention as appropriate to a particular application. For example, a process may utilize one transmit antenna and multiple receive antennas, multiple transmit/receive antennas, or any of a variety of architectures discussed herein.

Received Signal Model

The received signal y(t) at the i-th element can be represented as a quaternion valued signal $$y_i(t) = \sum_{n=1}^{M} H_{ni} x_n(t) + n_i(t) \quad (1)$$

or in matrix form $\underline{y}=H\underline{x}+\underline{n}$, where n(t) is assumed to be quaternion valued additive white Gaussian noise and $H_{ni}$ is the composite channel model from other transmit antenna to its receive antenna element, accounting for cascade of forward, backward and transmit and receive array factor and steered response along each polarizations. We drop the index for receiver element array for notational simplicity. The transmitted signal from each antenna port (i.e., horizontal/vertical)

$$s(t)=A(1+ap(t)+\beta m(t))\cos(2\pi f t+\theta) \quad (2)$$

where s(t) is related to x(t) in equation (1) with $H \in Q^{M \times N}$ Let $H^\Delta$ denote the quaternion conjugate-transpose of H where $$H=H_0+H_1 i+H_2 j+H_3 k \in Q^{M \times N}$$

where Q denotes the quaternion field. Let Λ represent the equalization matrix size of M×N. Λ is chosen such that $$\Lambda H^\Delta H^\Delta = I \quad (3)$$

There are numerous time and frequency domain approaches for solving for Λ.

After removing the DC component from equation (2), for the packet decoder estimates m(t), that is the payload from the sensor and subtracted from (2). Techniques for estimating a payload from a received signal including (but not limited to) Multi-Symbol Non-Coherent and Soft Input Soft Output decoders are discussed in U.S. Pat. No. 7,633,377 entitled "RFID Receiver" and U.S. Pat. No. 8,400,271 entitled "RFID Receiver," the relevant portions of which are hereby incorporated by reference in their entirety. Then a correlation is performed in localization algorithm for estimating time difference of arrival (TODA), based on the ranging signal.

In the waveform analysis by synthesis block, the following objective functions are used to find optimal Ø,θ, γ, η, and the weighting factor for each polarization. Objective function is $$\underset{\rho}{\text{Max}} \|y\|^2$$

subject to unitary condition in equation (3). Subsequently transmit update signal can be used to pre-equalize the transmit array for the next query round. Transmit control signal is used for directing the transmit array to proceed with the selected frequency and phase sequences for the next round.

Non-Line of Sight

When the tag is in NLOS (non-line of sight), multiple transmit arrays in a grid configuration can be used and machine learning employed on a quantized grid of 3-dimensional Euclidean space to arrive at the final location estimate. A set of sensors/tags with known locations in the 3D quantized grid can be used to train the machine learning model and adapt the equalization matrix to match the location of known sensors. During the training period, it is also possible to consider different antenna orientation of the tag with the known location. In which case, the quaternion valued estimated channel response is extended to account the orientation of the tag antenna as input training parameter into the machine learning algorithm. The values obtained at the end of the training period are subsequently used for each grid location, as initial condition of the antenna radiating in that particular grid configuration.

Further discussion of the relationship between representation as a complex value signal with quaternion value signal can be found in J. Tao, W. Chang, "Adaptive Beamforming Based on Complex Quaternion Processes," *Mathematical Problems in Engineering*, Vol. 2014, 2014 (available at: http://dx.doi.org/10.1155/2014/291249), the relevant portions of which are hereby incorporated by reference in their entirety.

Arrays Over Quaternions

Noting multiplication with quaternions is non commutative, the definition of correlation becomes ambiguous. Discussion of correlation in quaternions can be found in S. Blake, "Perfect Sequences and Arrays over the Unit Quaternions," 2016, December, unpublished, the relevant portions of which are hereby incorporated by reference in their entirety. Defining right and left correlation:

$$\theta^{right}(\tau)=\Sigma_{i=0}^{n-1} s_{i+\tau} s_i \text{ and } \theta^{left}(\tau)=\Sigma_{i=0}^{n-1} s_{i+\tau} s_i$$

A quaternion valued signal is called perfect $\theta^{left}(\tau)=\theta^{right}(\tau)=0$. By adding the constraint in our optimization problem stated in equation (4), we can restrict our choice of transmit pre equalizer over roots of unity.

Number of perfect sequences constructed exist [Ret]. In general these constructions of one form:

$$s = [s_{a,b}] = i^{\lfloor \frac{f(a,b)}{c} \rfloor} j^{\lfloor \frac{g(a,b)}{d} \rfloor}$$

where a, b, is sgr of the array f(a,b), g(a,b) bivariate polynomials with integer coefficients and c and d positive integers.

Computing Covariance Matrix: Received Signal

We assume one quaternion valued stochastic process of received signal is "centered" that is one probability density function is normally distributed and takes on the form:

$$\underline{y} \sim N(0, \Gamma)$$

$$P(\underline{y}) = \frac{1}{\sqrt{\pi \det(\Gamma)}} e^{-1/2 \underline{y}^t \Gamma^{-1} \underline{y}}$$

The derivation of correlation matrix $\Gamma = R[\underline{yy}^*]$ is discussed in N. Le Bihan, "The geometry of proper quaternion random variables," (unpublished), the relevant portions of which are hereby incorporated by reference in their entirety.

Machine Learning for MIMO Radar

Figure 9:
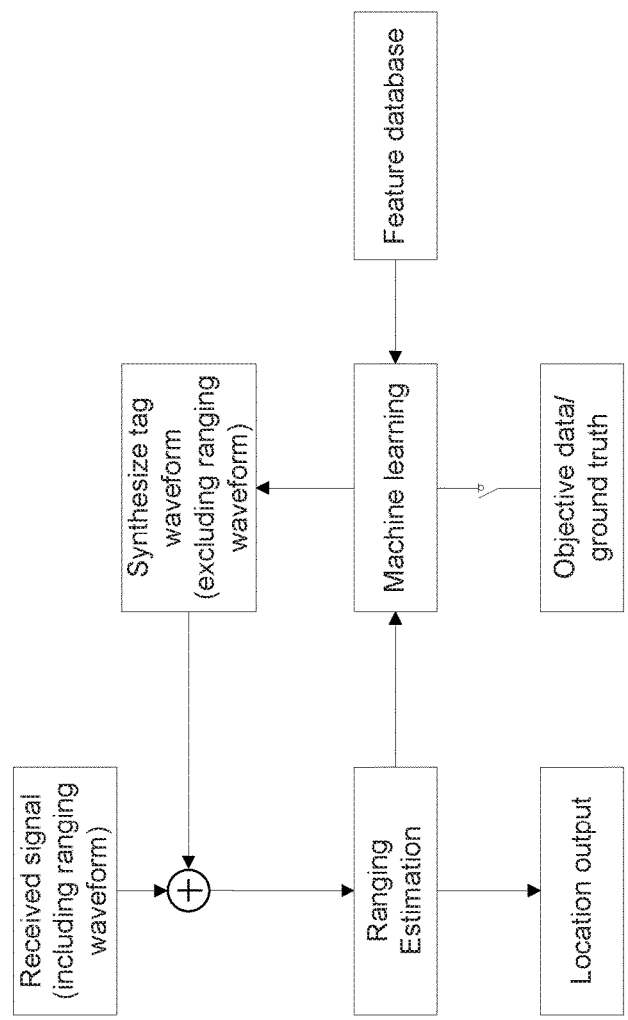
FIG. 9 is a system diagram illustrating components of an RFID reader system for generating a ranging estimate in accordance with embodiments of the invention.

FIG. 9 is a system diagram illustrating components of an RFID reader system for generating a ranging estimate using machine learning in accordance with embodiments of the invention. A sensor field with known location of each sensor in $\mathbb{R}$ forms the training dataset for the function block in FIG. 9. During training phase, each dataset is used for computing the error vector $\underline{e} = |\underline{x} - \hat{x}|^2$. Number of different approaches can be used for training the model, such as support vector machine (SVM), random forest, deep neural convolutional network to classify the dataset into discrete regions. These regions can range to anything from simplicial cubes, triangles, or Veronoi regions. In several embodiments, the ground truth is determined by placing the tags in a grid and continuing learning until the solution converges.

Once the training phase is completed, the pre-equalization matrix is set to initialize the query round for the particular antenna and array look direction in the specific region labeled in the training phase. In many embodiments, machine learning utilizes radiometric data from the receive combiner and equalizer filter bank. Radiometric data can be represented by quaternion $\underline{c}_i \in Q^M$ for antenna $i = 1, \ldots, k$. The possible locations can be quantized into a three-dimension lattice (or two-dimension grid) for each position $x_1 \in \mathbb{R}$ with $i = 1, \ldots, L$.

An operator G can be found to map $\underline{c} \xrightarrow{G} \underline{v}$ if $\hat{x} \in \{u_i: d(u, u_i) < \epsilon$ where $v_n = 1$ if the tag is in the position, 0 otherwise.

The output of this processing is a hypothesis detector test with a single non-zero digit in each iteration (e.g., 00010 . . . 0) corresponding to the presence of the tag position in the particular region. In this case the hamming distance for each respective quotient can be maximized for training the machine learning algorithm. As can readily be appreciated, any of a variety of processes can be utilized in accordance with the requirements of a given application.

Machine Learning Training

In training the neural net/machine learning model, with known location of each tag in the query, the labeled binary vector $\underline{v}$ is captured (i.e., ground truth) and the model is iterated with fixed radiometric data such that the output matches the vector $\underline{v}$.

Receive Channel Estimates and Equalizer

The channel model in the cascaded transfer function from transmit array to the tag and from the tag to the receive array. Let $h_{ij}^t$ and $h_{ij}^r$ respectively denote quaternion valued impulse response where $$H = \begin{bmatrix} h_{11}^t h_{11}^r & \cdots & h_{1N}^t h_{1M}^r \\ \vdots & \ddots & \vdots \\ h_{N1}^t h_{1N}^r & \cdots & h_{NM}^t h_{NM}^r \end{bmatrix}$$

It is well known $$H = U \begin{pmatrix} P^r & 0 \\ 0 & 0 \end{pmatrix} V^\Delta$$

where P is a real diagonal matrix and $U^{(N \times N)}$ and $V_{(M \times M)}$ are upper and lower quaternion signals value decomposition in quaternion. There are number of approaches to solve for H by zeroforcing or minimum mean square error nulling. Let us for simplicity denote each filter in the filter bank as $h^0(z)$. The prototype digital filter is $H^0(z) H^{notch}(z)$ where $H^{notch}(z)$ is a notch filter to eliminate any residual DC to enter into one system. Standard multirate symbol processing techniques for design of a filter based can be used to arrive at the coefficients of the impulse response of the filter. The pseudo inverse for H is subsequently used for transmit filter bank.

Alternating Signed Matrices—Transmit Array

Optionally due to practical constraints instead of transmit array in FIG. 7, a configuration for a transmit array such as that in FIG. 7A may be used.

That is each state of antenna polarization $\epsilon\{-1, 1\}$. Each set of polarization is fixed for the query cycle. In this case, it is possible to use special class of matrices to have mutually orthogonal properties, from one query round to the next.

In case of NLOS and rich scattering environment, it is desirable to construct a rich set of observables capturing the reflection of single bounce rays from the tag to the reader. When only using the preamble for TODA, the short length of the sequence lends itself for applying Hademard or Walsh matrices with property $BB^T = 1$. Note in this the output is complex value only, since single polarization is used in each element.

Assume number of transmit element in the array is 2N, then $$B_{2k} = \begin{bmatrix} B_{2k-1} & B_{2k-1} \\ B_{2k-1} & -B_{2k-1} \end{bmatrix}$$

with $$B_2 = \begin{bmatrix} 1 & 1 \\ 1 & -1 \end{bmatrix}$$

$B_{2k} = H_2 \otimes 2^{N-1}$, where $\otimes$ is Kronecker product.

Additional Considerations

In summary consider: the signal s(t) in equation (2) that consists of a spreading sequence p(t) for ranging and data modulation signal such as FM0 or Miller can be represented in quaternion that reflects the linear polarization of tag in any given position $(x_m, y_m, z_m)$ in 3-dimensional space which will be a linear combination of vertical and horizontal polarization of a tag which reflects only one polarization in any given direction. The received signal s(t) for the i-th multipath can be denoted by $s_i(t) = s(t - \tau_i)$ for the i-th multipath. $\tau_i$ is multipath delay. A one or two dimensional receiving antenna with M elements with steering vector $q(\theta_i, \varphi_i)$ in quaternion representation in direction of $(\theta_i, \varphi_i)$ (azimuth and elevation angle) corresponding to the i-th multipath. Channel coefficients $h(\theta_i, \varphi_i, \gamma_i, \eta_i)$ for the i-th multipath in direction of $(\theta_i, \varphi_i)$ (azimuth and elevation angle). $(\gamma_i, \eta_i)$ as discussed are angles that relates to amplitude and phase of channel coefficients for the i-th multipath. The received vector y for the receiver (one or two dimensional array) can be represented as a sum over I for finite number of received multipaths of product of $h(\theta_i,\varphi_i,\gamma_i,\eta_i)$, $q(\theta_i,\varphi_i)$ and $s_i(t)$ plus noise all in quaternions. At the receiver with antenna array, the receive vector y after channel coefficient estimation and removing data is correlated with spreading sequences for possible delays for the each i-th multipath. The output of correlators is a vector call u. As discussed in machine learning for a tag at any location $(x_m,y_m,z_m)$ in 3-dimensional space we obtain u for each possible reader and store it as reference. This can be referred to as a training phase. In real time location estimation then we collect all actual received u vectors from all possible readers and compare them with all possible stored reference u and choose the closest in Euclidean distance. This will provide the location (range) of the tag.

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A method for obtaining location information using an RFID reader system, the method comprising:
   generating an RFID interrogation signal waveform having a first frequency;
   generating a ranging waveform having a second frequency, where the second frequency is higher than the first frequency;
   combining the RFID interrogation signal and ranging waveform signal into a combined interrogation and ranging signal;
   splitting the combined interrogation and ranging signal to a plurality of transmit paths through a transmit array filter bank and modifying the signal in each transmit path using at least one transmit weighting factor, where each transmit weighting factor modifies a characteristic of the signal;
   transmitting a first filtered output signal from each of the transmit paths of the transmit array filter bank using one of a plurality of transmit antennas in a first interrogation round;
   transmitting a combined interrogation and ranging signal from a plurality of antennas, where the ranging signal is a pseudorandom signal;
   receiving a backscattered return signal from an RFID tag at one or more receive antennas;
   extracting an information signal from the return signal and decoding the information signal to obtain RFID tag data;
   extracting a received ranging signal from the return signal; and
   estimating a range to the RFID tag based upon correlation between the ranging signal and the received ranging signal.

2. The method of claim 1, further comprising adjusting at least one of the at least one transmit weighting factor based upon the output of the equalizer filter bank and a plurality of the calculated time-of-arrivals of the plurality of received return signals; and
   transmitting a second filtered output signal from each of the transmit paths of the transmit array filter bank using one of the plurality of transmit antennas in a second interrogation round, where the second filtered output signal is modified using the adjusted at least one transmit weighting factor.

3. The method of claim 2, wherein adjusting at least one of the at least one transmit weighting factor comprises applying machine learning to increase the correlation of the ranging signals.

4. The method of claim 2, wherein adjusting at least one of the at least one transmit weighting factor comprises applying machine learning to increase the read rate of the RFID tag.

5. The method of claim 1, wherein combining the RFID interrogation signal and ranging waveform signal into a combined interrogation and ranging signal comprises adding the two signals.

6. The method of claim 1, further comprising adjusting a characteristic of the transmitted combined interrogation and ranging signal in a subsequent interrogation round to increase read rate and ranging accuracy.

7. The method of claim 1, further comprising calculating the time-of-arrival of each of the plurality of received return signals.

8. A method for obtaining location information using an RFID reader system, the method comprising:
   transmitting a combined interrogation and ranging signal from a plurality of antennas, where the ranging signal is a pseudorandom signal;
   receiving a backscattered return signal from an RFID tag at one or more receive antennas;
   extracting an information signal from the return signal and decoding the information signal to obtain RFID tag data;
   extracting a received ranging signal from the return signal; and
   estimating a range to the RFID tag based upon correlation between the ranging signal and the received ranging signal;
   wherein receiving a backscattered return signal from an RFID tag at one or more receive antennas comprises receiving a plurality of backscattered return signals from an RFID tag at a plurality of antennas; and the method further comprises combining the plurality of received return signals using an equalizer filter bank to produce a combined return signal, and the combining further comprises modifying each received return signal using at least one receive weighting factor, where each receive weighting factor modifies a characteristic of the signal.

9. The method of claim 8, further comprising adjusting a characteristic of the transmitted combined interrogation and ranging signal in a subsequent interrogation round to increase read rate and ranging accuracy.

10. The method of claim 8, further comprising calculating the time-of-arrival of each of the plurality of received return signals.

* * * * *